July 9, 1957  C. D. FISHER  2,798,628
SELF-LOADING AND UNLOADING TRUCK FOR LOOSE BULK MATERIAL
Filed Sept. 7, 1954  6 Sheets-Sheet 2
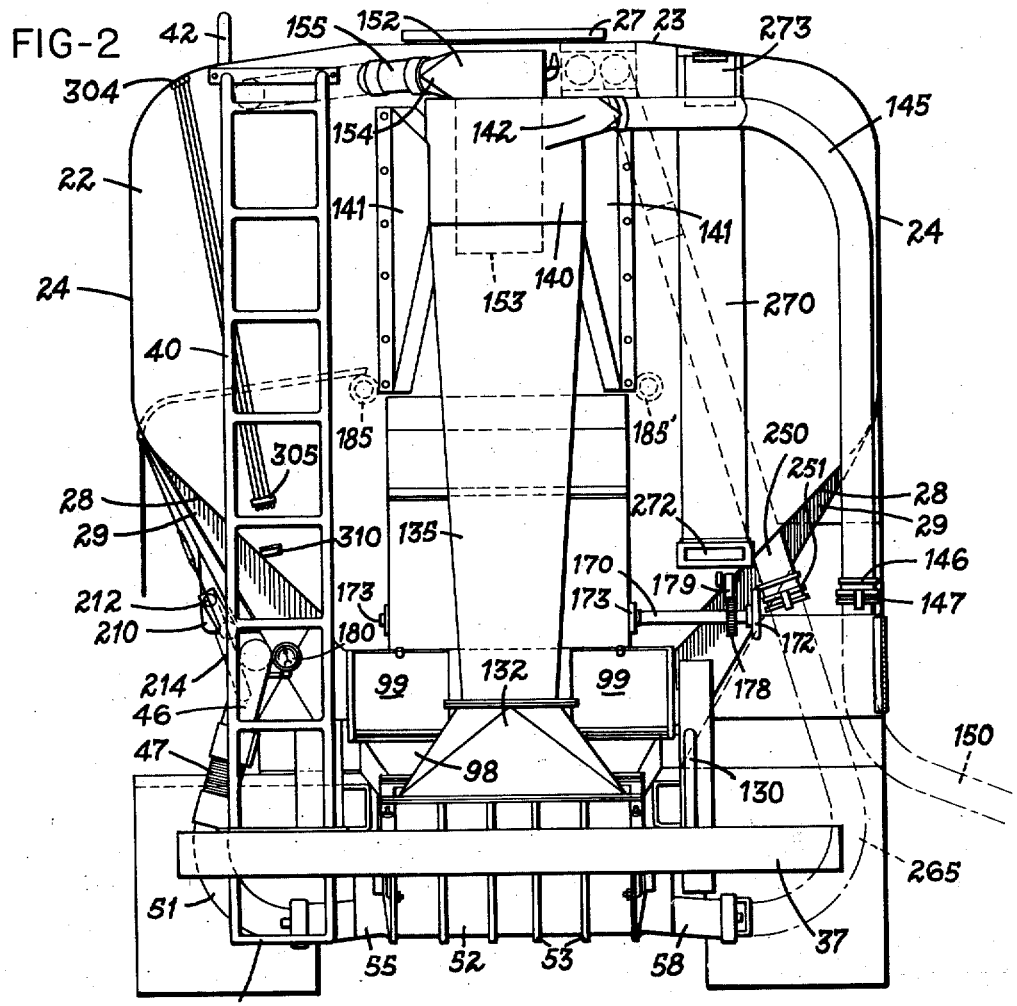
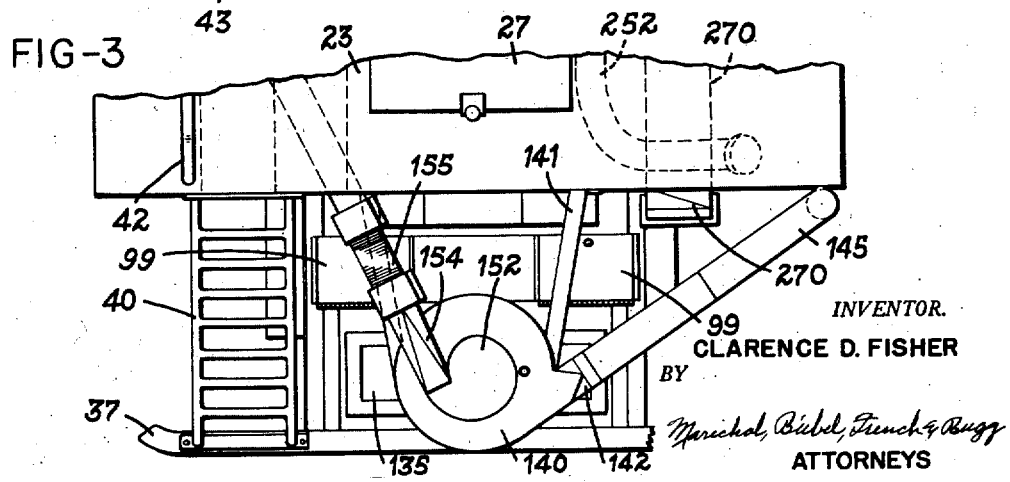
INVENTOR.
CLARENCE D. FISHER
BY
Marechal, Biebel, French & Bugg
ATTORNEYS

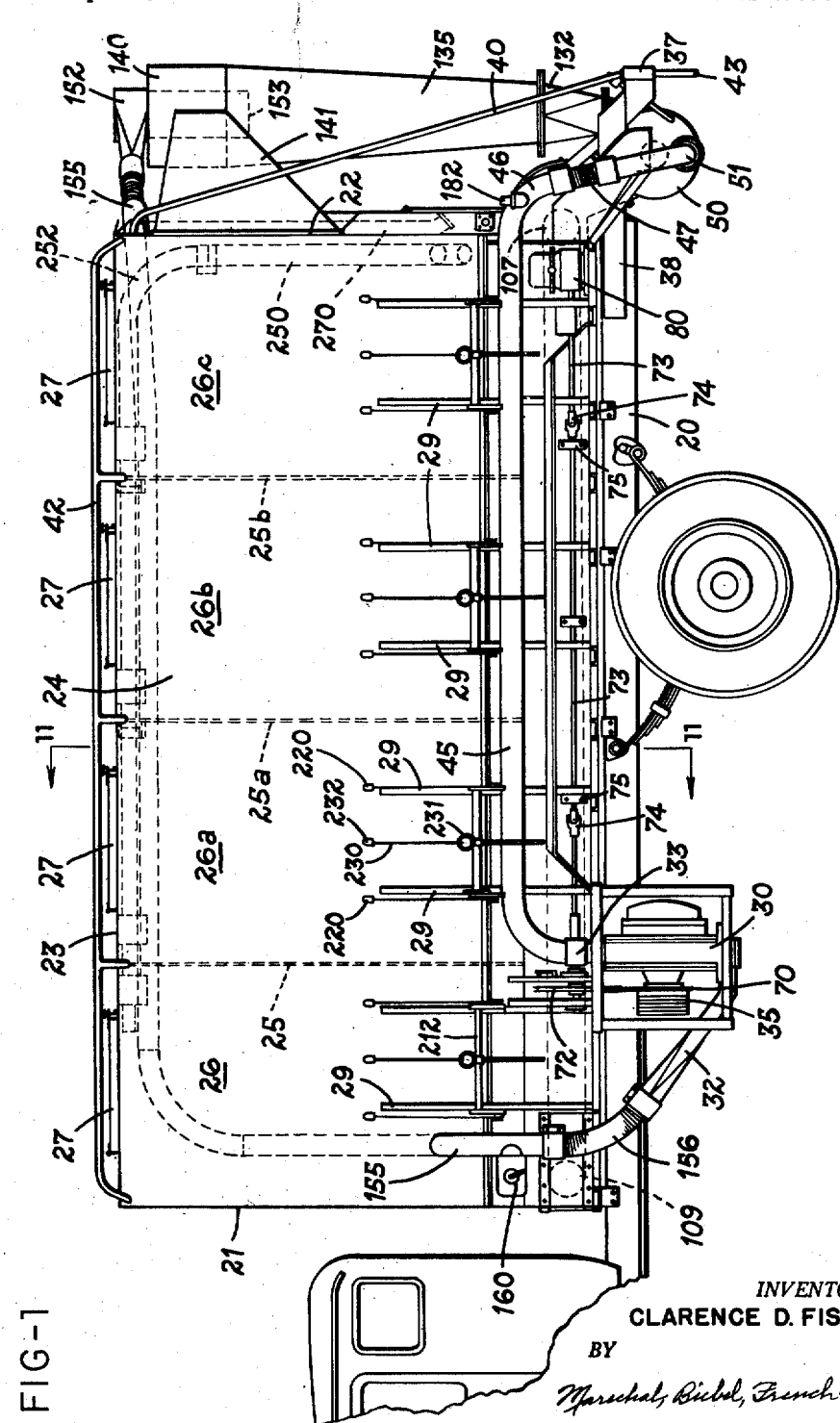

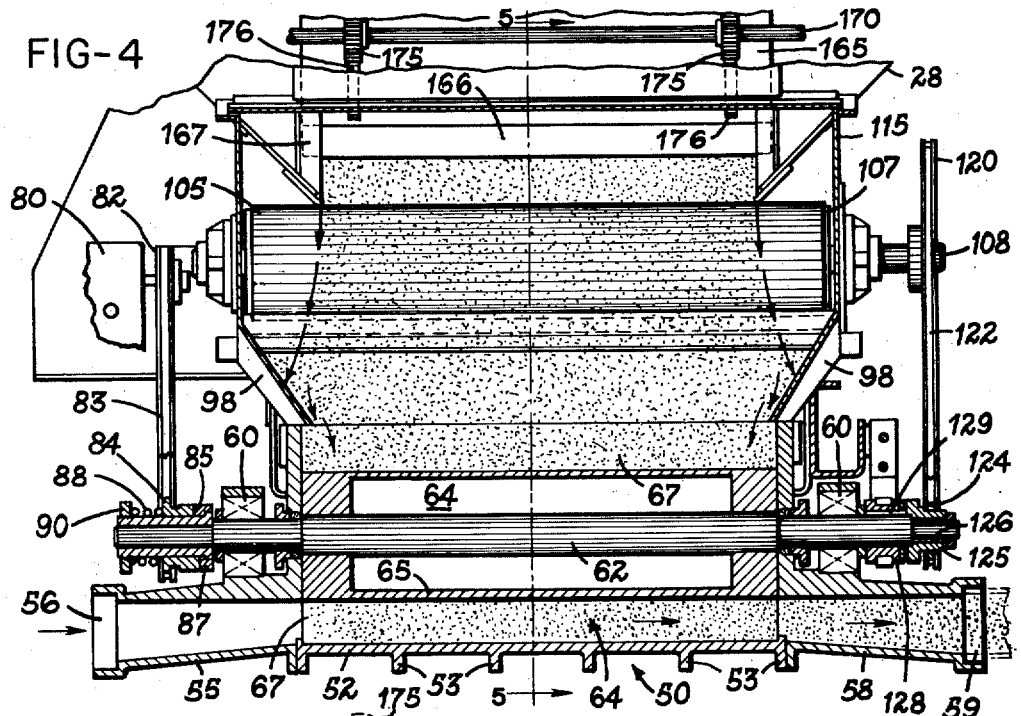
FIG-4
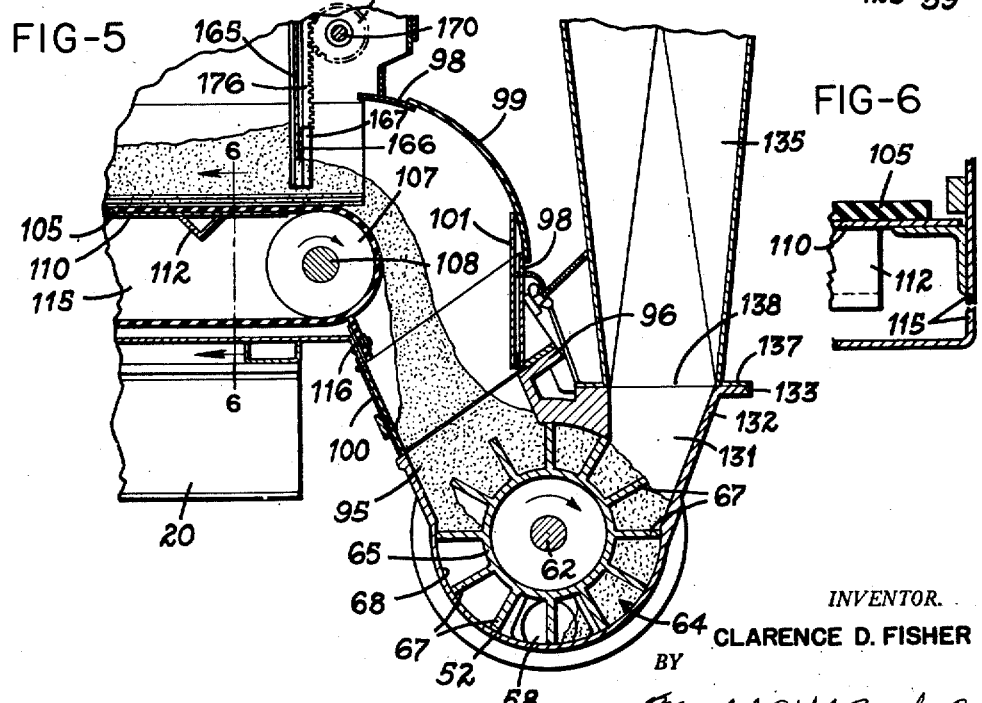
FIG-5
FIG-6
INVENTOR.
CLARENCE D. FISHER
BY
ATTORNEYS

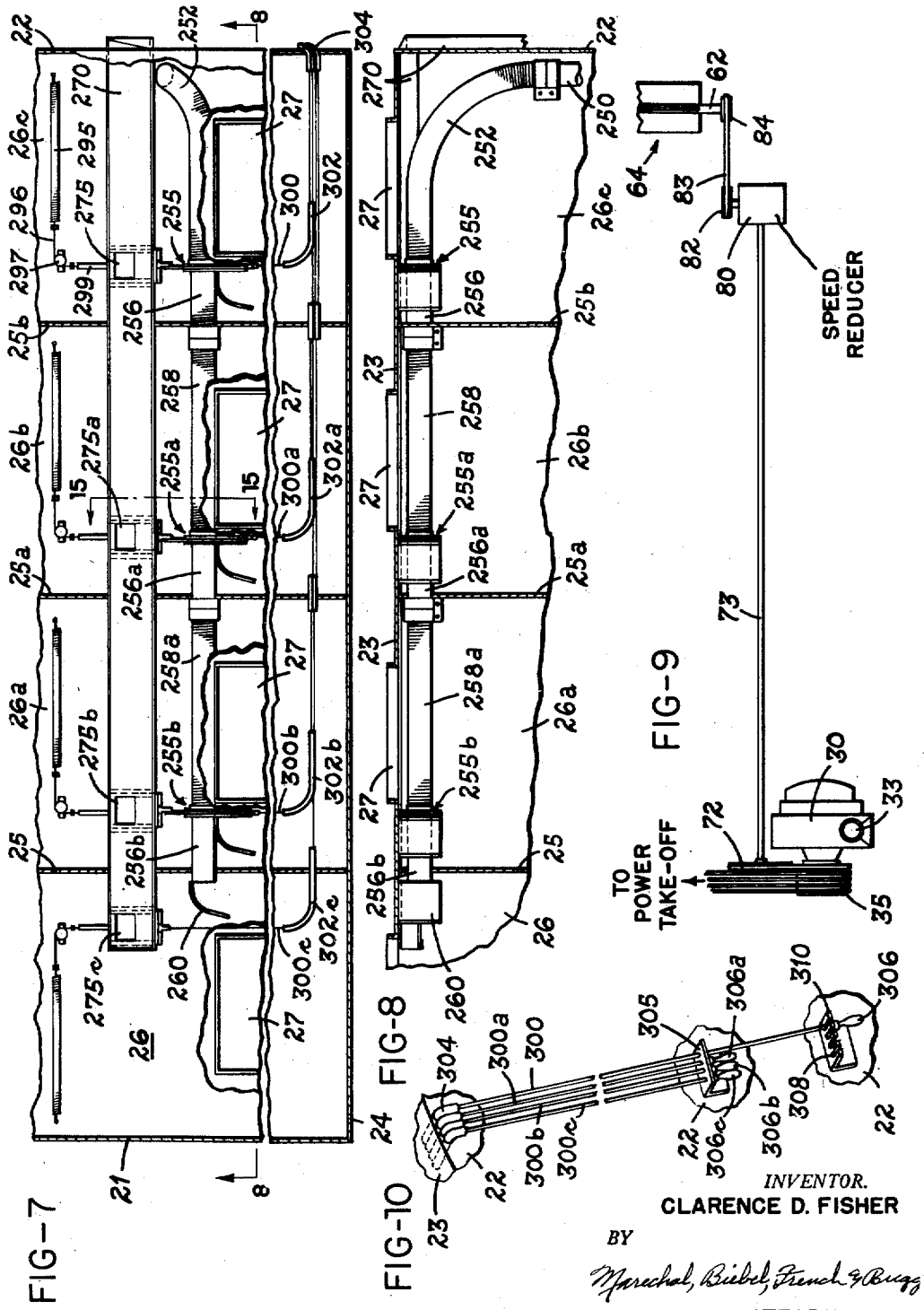

July 9, 1957   C. D. FISHER   2,798,628
SELF-LOADING AND UNLOADING TRUCK FOR LOOSE BULK MATERIAL
Filed Sept. 7, 1954   6 Sheets-Sheet 5
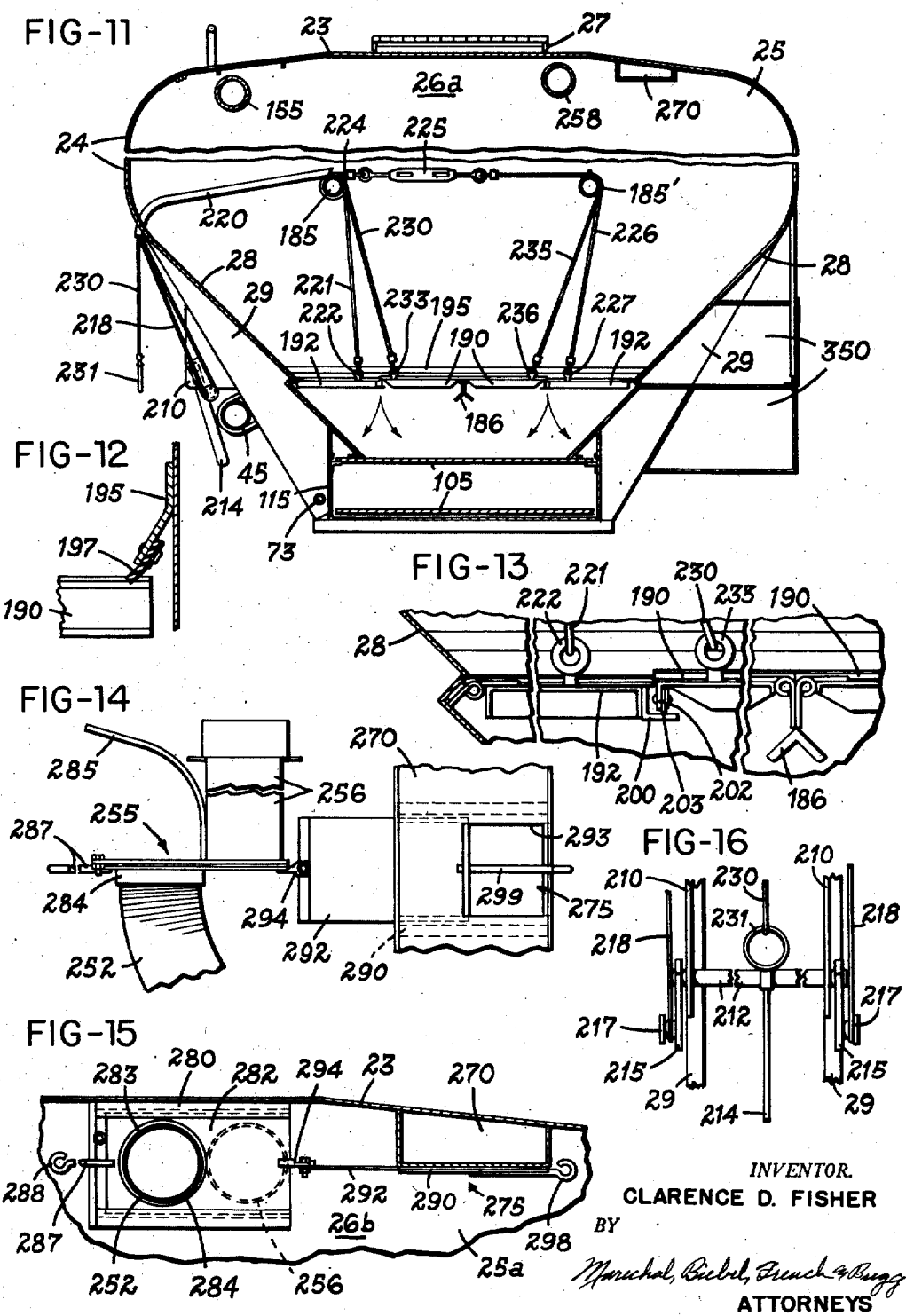
INVENTOR.
CLARENCE D. FISHER
BY
ATTORNEYS

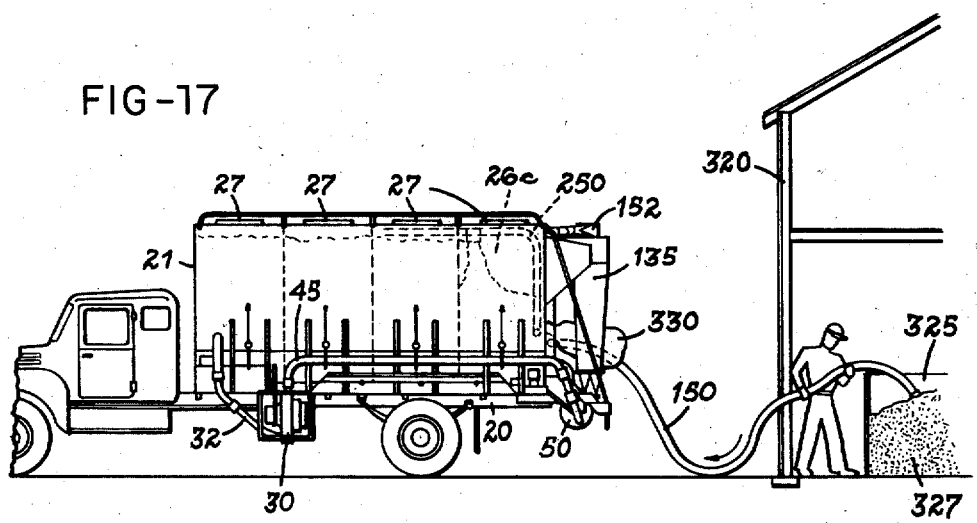
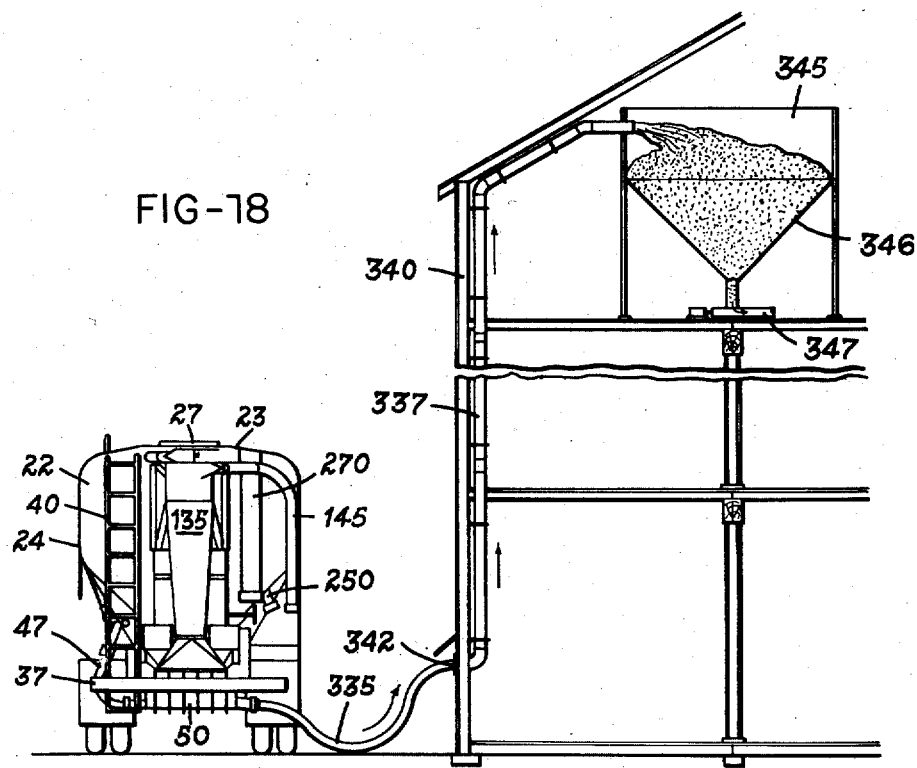

United States Patent Office 2,798,628
Patented July 9, 1957

2,798,628

SELF-LOADING AND UNLOADING TRUCK FOR LOOSE BULK MATERIAL

Chester Donald Fisher, Muncy, Pa., assignor to Sprout, Waldron & Company, Inc., Muncy, Pa., a corporation of Pennsylvania Application September 7, 1954, Serial No. 454,374

17 Claims. (Cl. 214—519)

This invention relates to a truck for transporting loose bulk material, and particularly to such a truck which is self-loading and unloading.

The present invention is concerned primarily with the transportation, collection and delivery of bulk feed and grain, although it is applicable to the transportation of many other types of loose bulk materials. At present many granaries or feed dealers provide a delivery service for bulk feed, and at the same time offer a collection service for grain or similar materials to the farmers. Delivery of the bulk feed is accomplished by packaging it in sacks or bags, loading these sacks manually onto a flat bed or similar type truck, and unloading them for the farmer at his place of usage. Obviously this practice requires considerable manual labor, is time consumptive, and results in further inefficiency from the standpoint of the amount of material transported, since the sacks themselves have considerable weight, and some air space will be left between them when they are piled on the truck. In addition, there is a certain amount of loss due to breakage of the sacks, and a further monetary loss necessitated by constant replacement of worn, torn and otherwise unusable sacks.

If it is proposed to deliver feed to the farmer in bulk, and to store such feed in large bulk feed containers in the farmer's barn or other storage space, further difficulties may be encountered. For example, if a bulk delivery truck is used having a screw-type conveyor extending from the truck to effect automatic unloading thereof, the unloading conveyor may be clumsy or unwieldly, especially in locating it at the proper point for unloading. Considerable maneuvering of such a truck may be necessary to properly locate the conveyor before commencing the operation since ordinarily the farmer's storage space is located indoors. Also, a two man crew may be required to operate such a truck, namely a driver and a conveyor operator. In addition, should the farmer have grain to be picked up and delivered to the granary or grain elevator, such a truck is unsuitable for the purpose since it cannot be loaded manually except with great effort, and the conveyor is of no use in loading.

The present invention is directed to a self-loading and unloading truck which will obviate this waste of time, material and labor by the provision of pneumatic means, operated from the truck and mounted thereon, which entrains the bulk material in a moving stream of high pressure air, drawing it from a collection bin into a loading device mounted on the truck and blowing the air-entrained material into storage bins on the truck. During unloading, the material is gravity fed through the bottom of the truck bins to a mechanical conveyor for carrying the material to the same air-entraining means used during the loading operation, which in turn delivers the material to a storage bin. The truck provided by this invention may be easily handled by a single driver-operator who can control the loading and unloading operations of the truck with ease, and sufficient lengths of flexible hose or conduit are carried on the truck for extension from the pneumatic loading and unloading means into a barn or other storage space, thus providing a highly flexible and easily assembled system which is readily applicable to delivery and to collection of loose bulk material.

It is a primary object of this invention to provide a self-loading and unloading truck for transporting loose bulk material wherein means are employed for entraining the bulk material in a stream of air under pressure to effect the loading and unloading operations.

A further object of the invention is to provide such a truck wherein all loading and unloading operations may be carried out under the control of a single person.

Another object of the invention is to provide such a truck which may be mechanically loaded and unloaded in addition to the air-entraining means normally used in loading and unloading operations.

A further object of this invention is to provide such a truck wherein the material-to-air ratio in the air-entraining means may be accurately controlled.

Another object of the invention is to provide such a truck wherein means are provided for collecting the dust arising during loading operations from agitation of the loose bulk material to prevent contamination of the surrounding atmosphere.

A further object of the invention is to provide such a truck having several storage bins thereon for receiving the material during transportation, and having means controllable from a single station for apportioning the bulk material between the several bins during loading operations.

Other objects and advantages of the invention will be apparent from the following description, the accompanying drawings and the appended claims.

In the drawings—

Fig. 1 is a side view of a self-loading and unloading truck embodying this invention;

Fig. 2 is a rear view of the truck seen in Fig. 1;

Fig. 3 is a plan view of the rear portion of the truck seen in Fig. 1;

Fig. 4 is a sectional detail on an enlarged scale of air-entraining means embodying this invention;

Fig. 5 is a section taken along line 5—5 of Fig. 4;

Fig. 6 is an enlarged fragmentary section taken along line 6—6 of Fig. 5;

Fig. 7 is a broken sectional view of the top of the truck seen in Fig. 1, showing the filling conduit and vent duct located within the top of the truck;

Fig. 8 is a partial section taken along line 8—8 of Fig. 7;

Fig. 9 is a schematic diagram of the power supply to the rear of the truck;

Fig. 10 is an enlarged perspective view of the control cables seen in Fig. 2;

Fig. 11 is a section taken along line 11—11 of Fig. 1;

Fig. 12 is a fragmentary detail section of the bin gate sealing means;

Fig. 13 is an enlarged fragmentary view of the bin gates seen in Fig. 11;

Fig. 14 is a detail view of the filling conduit and vent duct control means seen in Fig. 7;

Fig. 15 is an enlarged section taken along line 15—15 of Fig. 7;

Fig. 16 is an enlarged detail view of the bin gate control means seen in Fig. 1;

Fig. 17 is a view of a truck embodying this invention arranged for a loading operation; and Fig. 18 is a view of the truck during unloading.

Referring to the drawing, which illustrates a preferred embodiment of the present invention, and particularly to Fig. 1, there is seen a self-loading and unloading truck constructed in accordance with the invention to include a main frame or chassis 20 upon which is mounted a storage member defined by a front wall 21, rear wall 22, top wall 23, and side walls 24 between which extend bulkheads 25, 25a, and 25b to define compartments or bins 26, 26a, 26b, and 26c each having a covered loading hatch 27 in the top thereof. Each side wall 24 includes an inwardly tapering lower portion 28 which is transversely braced by a number of gusset plates 29 to stiffen the entire storage member.

Mounted in the lower front end of chassis 20 is a blower 30 having a suction intake 32 and a pressure outlet 33, and deriving its motive power through a pulley 35 which is connected to an appropriate power takeoff (not shown) from the main truck engine. If desired, a separate power plant for driving blower 30 may be provided. A suitable bumper 37 is attached to the rear of the chassis 20, as by straps 38, and a ladder 40 extends from the top of bumper 37 upwardly to the top of the rearmost bin 26c, at which point a hand rail 42 is attached to the top of the truck bins and extends forwardly across the top of all the bins to the foremost thereof to provide access to the top of the truck for manipulating the several hatch covers. A lower step 43 depends from bumper 37 immediately below the lower end of ladder 40 for ease of climbing onto the ladder.

The output 33 of blower 30 is received by a conduit 45, which extends from the blower rearwardly along the side of the truck to an elbow 46 just above and forward of bumper 38, and a flexible hose section 47 is connected thereto. Thus the high pressure stream of air from the blower outlet 33 is conducted to a pneumatic loading means which include an air lock indicated generally at 50 in Fig. 1, and having an inlet elbow 51 connected to the flexible section 47 to conduct the air from the blower into the air lock means.

Referring to Figs. 4 and 5, the air lock 50 is seen to include a generally cylindrical housing 52 provided with a number of reinforcing ribs 53, and having an inlet section 55 which is provided with an air inlet 56 for connection to the elbow 51. At the other side of housing 52 is an outlet section 58 provided with an outlet opening 59 for delivery of the air from the inlet 56 together with the bulk material which is entrained in the air within the air lock means, as will presently be described. The inlet and outlet sections 55 and 58 each are provided with a bearing 60 in which is journaled the shaft 62 of a paddle wheel 64 which includes a cylindrical closed tube 65 having a plurality of vanes or paddles 67 extending radially from the outer surface thereof into close sliding engagement with the inner surface 68 of the main housing 52. The distance between adjacent vanes 67 and inner surface 68 is such that the cross sectional area defined between any two adjacent blades and the tube and the housing is substantially equal to the cross section of inlet 56 and outlet 59. Thus when the vanes 67 are properly aligned with the inlet and outlet a substantially straight and continuous through passage is provided in the air lock 50. Since, however, the cross section between two vanes 67 is not greater than the cross section of inlet 56 or outlet 59, a high pressure stream of air blown through said passage will not undergo a loss of velocity as would be the case if the cross section between the vanes were larger or if the passage were tortuous.

The paddles 67 are rotated within housing 52 through a drive extending from blower pulley 35, and including a belt 70 driven thereby to rotate a sheave 72 which is mounted on a propeller shaft made up of several sections 73 connected by universal joints 74 and supported by suitable bearing members 75 along the side of the truck substantially parallel to the blower output conduit 45. The rearmost propeller shaft section is connected to a speed reduction gear arrangement 80 which in turn drives a sprocket wheel 82, and through this wheel a chain 83 which in turn drives a sprocket member 84 having a friction face 85 thereon. A cooperating friction member 87 is fastened to the shaft 62, and the two friction members are urged together by spring 88, the tension of which may be adjusted by a nut 90. This arrangement provides in effect a torque clutch which will slip upon jamming of shaft 62 and prevent damage to the drive mechanism.

The housing 52 is provided with a material receiving opening which extends axially along the housing and is defined by an outwardly extending wall or boss 95 terminating in a flange 96, which in turn receives a hopper indicated generally at 98 as extending upwardly above the main air lock housing 52 and including access doors 99. The hopper includes a normally closed side door 100 which may be opened forwardly of flange 96, and an inner, normally open, door 101 which may be closed across flange 96 when door 100 is opened to provide for mechanical unloading of the material without its passage through the air lock 50.

During unloading of the truck, the material within the bins is fed to the hopper 98 on an endless conveyor belt 105 which extends beneath the bottom of all the bins and is actuated by a powered drum 107 mounted upon a rotatable shaft 108 at the rear of the truck and an idler drum 109 (Fig. 1) at the forward end thereof. The upper or load carrying portion of belt 105 is supported by a platform 110 which extends beneath substantially the entire load carrying surface of the belt, and is in turn braced by a number of angle bars 112 extending transversely of the platform beneath the opposite side walls 115 (Fig. 11) which provide a substantially closed housing for the conveyor. Any material sticking to the belt is scraped off into the hopper by a flexible scraper bar 116 (Fig. 5).

Referring to Fig. 4, the power for the conveyor is supplied to drum 107 through a sprocket 120 attached to shaft 108 and driven by a chain 122 which is in turn driven by a drive sprocket 124 on a freely rotatable clutch element 125 mounted coaxially on one end of shaft 62 by means of a bearing 126. A conveyor clutch element 128 is rotatably driven by shaft 62, and is keyed at 129 to slide axially of the shaft upon actuation by a clutch control lever 130 (Fig. 2) to engage the clutch element 125 anl thus drive the conveyor belt simultaneously with the rotation of vanes 67 in the air lock.

During loading operations the clutch element 128 is moved to its non-driving position, and the conveyor belt is stopped. Material is then supplied to the air lock through a second axial opening 131 (Fig. 5) defined by walls 132 extending outwardly from the main housing 52 and terminating in a flange 133. A collector tank 135 is mounted by means of a cooperating flange 137 upon the housing flange 133 so that the bottom opening 138 defined by the flange 137 is in alignment with the housing opening 131.

Referring to Fig. 2, the tank 135 is seen to include a substantially cylindrical upper portion 140 to which is attached a pair of bracing struts 141 extending from rear wall 22 to hold the collector upright. An inlet opening 142 enters the top of upper portion 140 at an angle which is substantially tangent to the inner surface thereof. Attached to opening 142 is a collector conduit 145 which extends across the rear of the truck to the right side thereof and then downwardly to a terminal portion 146 provided with a coupler 147, and which receives a collector tube 150 during loading operations only.

At the top of cylindrical tank portion 140, and extending coaxially thereinto, is a cylindrical air receiving portion 152 which opens at its lower end 153 into the tank 135, and which has a tangential opening 154 at its upper portion connected to a suction tube 155 which in turn leads to the blower inlet 32 through a flexible elbow 156. When loading the truck, the blower intake produces, through tube 155, a reduced pressure within tank 135 and this reduced pressure is in turn applied to the collector conduit 145 to draw material from a source external of the truck into the upper opening 142, thus introducing the entrained material tangentially into cylindrical portion 140 whch acts as a centrifugal or cyclone type separator. The entrained material whirls about the inner walls of tank 135 and drops to the bottom opening 138 thereof, while the entraining air enters the lower open end 153 into the air receiving portion 152 and thence proceeds to the blower intake. Since the entire above described apparatus is not needed during unloading, the collector tank is disconnected from the blower intake 32 by means of a butterfly valve 160 (Fig. 1) which vents the conduit 155 to atmosphere immediately adjacent the blower intake and thereby disengages the entire collector tank 135 from the air pressure system.

During unloading operations, as previously described, the conveyor belt 105 carries the bulk material from the bins to hopper 98. Although the rotational speed of the air lock vanes 67 is matched to the travel of the belt 105, it has been found that if an excess of material accumulates in the hopper 98, and by reason of its own mass packs too tightly between the vanes 67, the blower will be too greatly taxed in moving the material from between the vanes 67, and therefore a level control gate 165 having a flexible lip portion 166 is mounted transversely across belt 105 immediately above drum 107 and adjacent the hopper 98. Suitable slides 167 provide vertical guidance for adjustment of the gate 165 relative to the belt, so that the level of the material flowing over the end of the belt into the hopper may be adjusted by moving gate 165 vertically. A shaft 170 having a hand wheel 172 attached thereto is journaled in suitable bearings 173 (Fig. 1) and connected through pinions 175 and racks 176 attached to gate 165 to provide vertical adjustment of the gate upon rotation of the hand wheel. A ratchet wheel 178 fastened to shaft 170, and a cooperating pawl 179 hinged to the rear wall of the truck act to hold the gate in any selected position. An air pressure gage 180 is connected into elbow 146 and inclined rearwardly to be viewed from across the rear of the truck. The operator, by observing the setting of the gage and rotating the hand wheel 172 appropriately, may control the level of material on the conveyor belt and thus maintain the desired back pressure on the blower to govern the material-to-air ratio within the air lock.

In addition, a blow-off or safety valve 182 is provided in the blower output conduit 45, to prevent buildup of any substantial back pressure on the blower. It has been found that this valve may be most effectively set at about 5 pounds per square inch gage, and the material-to-air ratio within the air lock controlled within a range of air pressures less than five pounds.

The bottom of the several bins may be left open to provide for direct gravity feed of the material contained therein onto conveyor belt 105. However, it may be desirable to relieve the static load on the belt and its associated platform 110 due to the weight of the material in the bin, and therefore control gates or doors are provided to control access from the bins to the conveyor. Referring to Fig. 11, a cross section of one of the bins reveals a pair of longitudinal bracing tubes 185 and 185′ which extend the length of the bins, and a longitudinal bracing angle bar 186 which likewise extends the length of the bins and is secured to the opposite bulkheads thereof. The angle bar 186 divides the lower opening of the bin transversely in half, and a pair of center doors 190 are hinged thereto for pivotal movement from a closed position extending horizontally across the bin to a dropped open position along the sides of angle bar 186. A cooperating pair of outer doors 192 are hinged to the side wall portions 28 of the bins to swing from a horizontal closed position cooperating with the central doors 190 as shown in Fig. 11, to a dropped open position wherein they lie substantially parallel to the lower side walls of the bin.

Referring to Fig. 12, there is seen a portion of bin bulkhead 25, and attached thereto a strap 195 which extends across the entire width of the bin and has secured to its lower edge a rubber gasket member 197 for cooperation with the doors 190 and 192 to form a seal therewith when the doors are in their raised or closed position. Referring to Fig. 13, wherein the doors 190 and 192 are shown on a larger scale, it will be seen that the outer doors 192 including L-shaped depending lips 200 which extend the entire length of the door, and the central doors 190 having a vertically depending lip 202 fastened thereto with a sealing gasket 203 extending the length thereof, and being compressible against the L-shaped lip portion 200 of the outer doors during closure thereof to seal the door opening. This construction requires that the outer doors open first, and conversely, when closing, that the center doors be first drawn to their horizontal closed position.

Suitable control means for operating the doors from the exterior of the truck are provided, and referring to Figs. 1 and 2 are seen to include bracket plates 210 secured to extend outwardly of gusset plates 29 and provide a support for cross shafts 212. Since the door controls for each individual bin are identical, only one set of controls will be described in detail, it being understood that reference is made to identical parts associated with each bin in each instance. A control arm 214 is attached to each shaft 212 for manual rotation thereof between the bracket plates 210, and lever arms 215 are secured to the opposite ends of the shaft to be rotated thereby. Pulleys or rollers 217 are attached to the free outer ends of arms 215, and control cables 218 are looped around the pulleys and extend inwardly through a guide tube 220 and over the adjacent bracing tube 185.

One end 221 of cable 218 is attached to an eye 222 on outer door 192, and the other end 224 of the cable is attached to a turnbuckle 225. From the turnbuckle a second cable 226 extends around the opposite bracing tube 185′ and downwardly to an eye 227 on the other outer door 192. Thus the turnbuckle 225 provides for simultaneous actuation of the two outer doors 192, and referring to Fig. 11, it will be seen that by pushing the control arm 214 in a counterclockwise direction toward the truck the operator can cause the lever arms 215 to act as an over-center locking device, since the centerline of pulleys 217 is then closer to the truck than the centerline of shafts 212 and the tension in the cable will tend to draw lever arms 215 in a counterclockwise direction, in which direction control arm 214 can no longer rotate. The outer doors are thus locked in their closed position, and since the lips are thus locked in their closed position, and since the lips 200 on the outer doors are supporting the inner or central doors 190, the entire set for the appropriate bin will be locked in the closed position.

Conversely, to open the bin doors or gates the operator has but to pull on the arm 214 and the weight of the grain acting on the doors will assist in forcing them to their open position. After the bin has been emptied and it is desired to close the doors or gates, it is necessary to first pull the central doors closed so that the lips 200 and 202 will meet properly, and therefore a cable 230, provided with a hand ring 231, extends through a cable conduit 232 (Fig. 1) which is substantially identical to the conduits 220, and thence over bracing tube 185 to an eye 233 on inner door 190. A similar cable 235 is attached to eye 236 on the opposite central door and extends around the other bracing tube 185′ to a turnbuckle (not shown) which is in turn connected to cable 230 to provide for simultaneous actuation of the central doors. When closing the doors, the operator first engages and draws down upon the hand ring 231 to bring the central doors into closed position, and then moves the control arm 214 into its locked closed position.

When loading the truck at the mill or granary the hatch covers 27 are removed and the material is poured into the several bins through the hatches from an overhead source. However, such loading is not possible at a farm, for instance, and while it is possible to merely extend a loading tube from the air lock 50 to the appropriate hatch, this would necessitate the operator continually climbing to the roof of the truck via ladder 40 and dragging the tube with him. To avoid this time consuming operation a filling conduit 250 extends through the wall 28 of the rearmost bin 26c, and terminates at the outer surface thereof in a removable cap 251. The filling conduit extends upwardly within the rear portion of bin 26c to the top thereof, wherein it includes a flexible elbow 252 for extension forwardly toward the front of the truck.

Referring to Fig. 7 there is seen the filling conduit system including the elbow 252 connected to a gate valve indicated generally at 255, through which valve a conduit section 256 is in communication with the elbow. Section 256 is mounted in the upper portion of bulk head 25b and extends therethrough to a connection with a flexible conduit section 258 in the adjacent bin 26b. Similarly, section 258 is attached to a second gate valve 255a through which it communicates through a section 256a with a further flexible tube 258a in bin 26a. Finally, the flexible tube 258a is connected to a third gate valve 255b which in turn communicates with a tubing section 256b through bulkhead 25 to the interior of the foremost bin 26, wherein a deflector baffle 260 is positioned at the front end of the filling conduit to direct the air entrained material centrally into the bin.

During loading operations, as described previously, the collector tank 135 is placed under a reduced air pressure and draws air and entrained bulk material from a source external of the truck through collector tube 150 and conduit 145. The material is supplied to the air lock 50 and from there is blown through outlet 58. In order to fill the several bins on the truck a filling tube 265 is connected to outlet 58 and to the outer end of filling conduit 250 in place of the cap 251 thereon. Thus the air entrained material is forced upwardly through the filling conduit into the several bins as desired.

During such loading operations the air entrained material falls into the several bins and dust may arise from the agitation of the material. Further, if the several bins 26, 26a, 26b and 26c were all completely closed, there would be no way for the air to escape after the material has dropped to the bottom of the bins. Accordingly, this air which carries with it substantially all of the dust arising during loading, is channeled to the surrounding atmosphere through a vent duct 270 which is substantially rectangular in cross section and extends through the top of the bins substantially parallel to the filling conduit, outwardly through the rear wall 22, and thence externally of the truck down across the rear wall to terminate in an atmospheric opening 272 over which is affixed a dust filter 330. A clean-out door 273 (Fig. 2) is provided at the upper portion of duct 270 to provide access to the duct inside the bins, thus allowing a suitable cleaning tool to be inserted into the duct if it becomes clogged. Duct 270 is closed off from the upper portion of each of the bins, and vent gates 275, 275a, 275b and 275c are provided in each bin to permit selective opening of the several bins to the vent ducts.

Referring to Figs. 14 and 15, there is seen in detail one of the vent gates 275 and the adjacent gate valve 255. In these detail figures the gate and valve are both in their open positions, as they would be when loading the associated bin 26c. The gate valve 255 includes a slide frame 280 which is mounted to the top of the bin and a slide 282 which is mounted within the frame for horizontal sliding movement. The slide is provided with an aperture 283 at one side thereof which is surrounded by a cylindrical sleeve 284 for receiving the end of flexible conduit 252, as best seen in Fig. 14.

The fixed conduit section 256 is secured to the slide frame at one side thereof, and a curved baffle 285 is secured at one edge to the center of the frame adjacent the conduit section 256, so that transverse movement of the slide 282 within its frame aligns the aperture 283 with either conduit section 256 or baffle 285 in the respective closed or open positions of the gate valve. Thus, by drawing the slide transversely of its frame, as by means of a rod 287 which is secured to the slide and terminates in an eye 288, it is possible to provide for movement of the air entrained material through the fixed conduit section 256 to one of the other bins, or to align the flexible conduit portion 252 with baffle 285 and direct the material into the associated bin 26c.

At the same time, as previously explained, it is necessary to vent the bin during loading operations, and for this purpose the vent gate 275 is seen to include a slide frame 290 which supports a sliding gate 292 for covering an aperture 293 formed in the vent duct 270. The gate 292 is secured by a short connector rod 294 to the gate valve slide 282, so that opening movement of the gate valve results in opening movement of the vent slide 292. Both the valve 255 and gate 275 are normally urged into a closed position by a spring 295 (Fig. 7) which is secured at one end to the bin structure, and at its other is fastened to a short cable 296 which extends around a fixed pulley 297 to attachment with an eye 298 at the end of a rod 299 (Fig. 14), which is in turn attached to vent slide 292 to urge it and the attached gate valve slide 282 into closed position.

Since identical structure is provided for the vent gates 275a and 275b, and the gate valves 255a and 255b, they will not be described in detail. The operating structure for vent gate 275c is similar in detail to the vent gate mechanism just described in connection with gate 275, however, since there is no gate valve in the foremost bin 26, the control is provided only over the vent gate 275c.

In order to provide for remote control of all the gate valves and vent gates, and thus to enable the operator to selectively fill any desired bin from a single control station on the truck, each gate valve 255, 255a and 255b has attached thereto control cables 300, 300a and 300b, and a fourth control cable 300c, is attached directly to the slide of vent gate 275c. These four cables, as shown in Fig. 7, extend across the top of each of the bins to curved guide conduits 302, 302a, 302b and 302c, respectively, through which the cables pass and turn rearwardly of the truck to a cable guide 304 which includes four separate conduits joined side by side, and which extends through the rear wall 22 and then downwardly thereof, as seen in Fig. 10. The four control cables then extend through separate apertures in a cable guide member 305 which is secured to the wall 22 and extends outwardly thereof, and each cable terminates in a handle 306, 306a, 306b and 306c. These handles normally are drawn into abutting relation with the guide 305 due to the tension on each cable system provided by the several springs 295 (Fig. 7) which also hold the vent gates and gate valves closed.

To open a desired gate valve and vent, the operator has only to grasp the appropriate handle and draw the attached cable downwardly until the handle may be inserted in a slot 308 provided in a cable stop member 310 secured to the rear wall 22 at a predetermined distance beneath the guide member 305. The travel necessary to permit engagement of handle 306 with the stop 310, as seen in Fig. 10, is sufficient to draw both the gate valve 255 and associated vent gate 275 open, thus providing for loading of bin 26c. Following this example, any one of the gate valves and vent gates may be opened as desired to apportion the material being loaded among the several bins in any order of filling.

As an example of a self-loading operation which may be performed by the present invention, Fig. 17 illustrates the truck provided by this invention parked adjacent a structure 320, for example a barn or shed, within which is located a container 325 of bulk material 327. The operator has placed the collector tube 150 within the container 325, and the material 327 is being drawn therethrough into the top of collector tank 135, from whence it proceeds through the air lock 50 to the filling tube 265 and filling conduit 250, and is being loaded into the rearmost bin 26c. During this process the entrained air gathers the dust arising in the bin from the loading operation, and this dust laden air passes out through vent duct 270 to a filter 330 which is attached to the atmospheric opening 272 thereof.

Fig. 18 illustrates a truck such as provided by this invention unloading material, for example bulk feed or grain, by blowing it through an unloading conduit 335 to a duct 337 which is secured to the wall of a barn indicated generally at 340. The duct 337 includes a coupling 342 which passes outwardly through the wall of the barn for attachment to the unloading tube 335, and the duct then leads upwardly within the barn into a storage container 345 having a conical bottom 346 which empties into a delivery duct or conduit 347. Thus, the farmer's complete supply of feed or grain may be delivered into his storage container 345, and will flow by gravity through the conduit to any desired outlet location within the barn.

During such unloading operations the conveyor belt 105 is energized through clutch 128, and the doors 190 and 192 of a desired bin are opened to permit flow of the bulk material onto the belt and rearwardly therealong to the air lock means 50, from whence the material is entrained in a stream of high pressure air delivered to the air lock means by blower 30, and the air entrained material is delivered through the unloading tube 335.

It is of course desirable to provide several lengths of flexible hose for use in unloading and loading operations, and in order to store this hose on the truck during transportation, a compartment 350 is provided along the right side of the bins, opposite from the propeller shaft 73 and the several door operating mechanisms, to receive several lengths of flexible tubing which may make up the necessary loading and unloading tubes or conduits above described.

While the primary purpose of this invention is to provide a self-contained truck for transporting loose bulk material which is capable of self-loading and self-unloading operations, it is possible to provide a truck embodying only the self-unloading features thereof if desired. In such instance the collector tank 135, the suction conduit 155, and the loading conduits 145 and 150 would be omitted, and the truck would be loaded only by pouring the material through the several hatches 27 as desired.

The versatility of operation provided by a truck constructed in accordance with the invention will be readily appreciated from the fact that it may be unloaded mechanically by means of the conveyor belt 105 alone, in conjunction with bypassing the material fed from the conveyor through an opening at the rear of the truck provided by opening door 100 and closing door 101. In addition, the combined mechanical and pneumatic unloading provided by the invention permits delivery of the material from the truck to a point some distance away depending upon the length of the delivery conduit 150 and the capability of blower 30 to supply sufficiently high pressure. Loading operations may be carried out with the pneumatic loading apparatus above described, or the truck may be loaded from an overhead source through the several hatches 27.

During the course of loading and unloading operations, the driver-operator can maintain complete control over the apparatus without climbing up upon the truck or leaving the location of the truck except for initial coupling of the loading and unloading conduits. For example, it will be seen that the door control handles 214, the clutch lever 130, the gate control wheel 172, the cable handles 306, 306a, 306b and 306c, and the butterfly valve 160 are all accessible to a person standing on the ground next to the truck, and proper manipulation of these controls affords complete governing of the loading and unloading operations.

Furthermore, the pneumatic loading and unloading system is completely independent of the bin structure and does not rely upon maintenance of a vacuum within the bins for its operation. These bins, therefore, do not have to be made air tight, and can be constructed of relatively thin or light gage sheet metal.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a self-loading and self-unloading truck for transporting loose bulk material, the combination which comprises a bin on said truck for receiving said material, suction means including a receptacle separate from said bin for withdrawing material from a supply thereof outside said truck into said receptacle during loading, said suction means effecting evacuation of said receptacle without evacuating said bin, means for entraining said sucked-in material from said receptacle in a stream of air under pressure, means for conducting said air-entrained material into said bin during loading, means for separating said material from said entraining air stream and depositing said material in said bin, means for exhausting said air stream from said bin, means for conveying material contained in said bin to said air-entraining means during unloading operations, and means for conducting said air-entrained material outside said truck during unloading.

2. In a self-loading and self-unloading truck for transporting loose bulk material, the combination which comprises a bin on said truck for containing said material, a collecting tank separate from said bin, air pressure supply means for sucking said material into said collecting tank from a supply of material outside said truck during loading, air-entraining means for receiving said sucked-in material from said collecting tank and entraining said material in a stream of high pressure air, means for conveying material contained in said bin to said air-entraining means during unloading operations, and means for conducting said entrained material from said air-entraining means selectively into said bin during loading operations and outside said truck during unloading operations.

3. In a self-loading and a self-unloading truck for transporting loose bulk material, the combination which comprises a bin on said truck for containing said material, a collecting tank of substantially less volume than said bin for initially receiving said material during loading, air pressure supply means for sucking said material into said tank from a supply of material outside said truck, said air pressure supply means effecting evacuation of said tank without evacuating said bin, air-entraining means for receiving said material from said tank and entraining said material in a stream of high pressure air from said air pressure supply means, means for conveying material contained in said bin to said air-entraining means during unloading operations, and means for conducting from said air-entraining means material entrained in said airstream selectively into said tank during loading operations and outside said truck during unloading operations.

4. In a self-loading and self-unloading truck for transporting loose bulk material, the combination which comprises a bin on said truck for containing said material, a collecting tank for initially receiving said material during loading, air pressure supply means for exhausting said collecting tank to suck said material thereinto from a supply of material outside said truck, air-entraining means communicating with said collecting tank for receiving said material therefrom and entraining said received material in a stream of high pressure air from said air pressure supply means during loading, means for conveying material contained in said bin to said air-entraining means during unloading operations, and an outlet conduit from said air-entraining means adapted selectively to conduct material entrained in said air stream from said air-entraining means into said bin during loading operations and to the outside of said truck during unloading operations.

5. A self-loading and self-unloading truck for transporting loose bulk material comprising in combination a bin supported on said truck, said bin having a filler opening adjacent its top, conveyor means for carrying the material away from said bin, means for entraining said material in an air stream including a blower and air lock means, said air lock means being connected at one end to the output of said blower and in flow communication with said conveyor means for receiving material therefrom and entraining it in the air stream from said blower, conduit means connected to the opposite end of said air lock means for receiving air-entrained material and selectively conducting said material to said filler opening during loading and outside said truck during unloading, a collector tank for initially receiving material during loading, conduit means connecting the intake of said blower to said tank for reducing the pressure therein, means for conducting material received in said tank into said air lock means, and a loading conduit connected into said tank for drawing air-entrained material thereinto from a source external of said truck during loading.

6. In a self-loading and self-unloading truck for transportation of bulk material and having a bin for containing said material, the combination for loading and unloading said material from said truck which comprises a blower, a substantially cylindrical housing, a paddle wheel in said housing extending along the axis thereof and having a plurality of vanes projecting radially to adjacent the inner surface of said housing, means for rotating said paddle wheel, means for conveying said material from said bin radially into said housing, conduit means directing the output of said blower axially through said housing between said vanes to entrain the material enclosed therein in a stream of air, a discharge conduit connected to said housing opposite said conduit means to receive said entrained material and conduct it selectively to a space external of the truck during unloading operations and into said bin during loading operations, a separator, conduit means connecting the intake of said blower to said separator for reducing the pressure therein, means for conducting material from said separator radially into said housing, and a loading conduit connected to said separator for drawing air-entrained material thereinto.

7. In a pneumatic self-loading and unloading truck for loose bulk material having a bin for said material and blower means for supplying air pressure, the combination which comprises air lock means including a paddle wheel rotatable therein, means for delivering said material from said bin to said paddle wheel during unloading, conduit means for supplying air under pressure from said blower means to said paddle wheel for blowing material out from between the vanes thereof, a discharge outlet from said air lock means for the air-entrained material, a collecting tank for loading, conduit means connecting said tank to the inlet of said blower means for mantaining reduced air pressure therein, means in said tank communicating with said paddle wheel for conducting material from said tank thereto during loading, and means for connecting said discharge outlet to said bin during loading.

8. In a self-loading and unloading truck for loose bulk material the combination which comprises a bin for said material mounted on said truck, an outlet at the bottom of said bin, air lock means including a paddle wheel, a conveyor for carrying said material from said bin outlet to said air lock means, metering means adjacent said conveyor for controlling the flow of material therealong, means supplying air under pressure to said air lock means for entraining material in the air stream supplied thereto, a discharge outlet from said air lock means for said air-entrained material, a collecting tank, means including said air supply means for maintaining said tank at a reduced pressure, a cyclone separator at the entrance to said tank, said tank communicating with said air lock means for supply of material thereto, means for connecting said discharge outlet to said bin during a loading operation, and conduit means for introducing material to be loaded into said entrance of said tank.

9. In a self-loading and self-unloading truck for transporting bulk material, the combination of a bin on said truck for receiving said material, a controllable gate in the bottom of said bin providing for gravity feed of the material therefrom, a filling conduit opening into the top of said bin, a control valve in said conduit, a hopper mounted on said truck spaced from said bin, conveyor means extending beneath said bin gate to said hopper for moving the material from said gate into said hopper, means for regulating the flow of material along said conveyor into said hopper, a blower mounted on said truck, air lock means connected to the output of said blower and in flow communication with said hopper for receiving the material therefrom and entraining it in the air stream from said blower, conduit means for conducting the entrained material from said air lock means to a storage space external of said truck during unloading and for conducting entrained material to said filling conduit during loading, a collector tank mounted on said truck, the bottom of said tank being in flow communication with said air lock and the top of said tank being connected to the intake of said blower for maintaining a reduced pressure therein, and a loading conduit for drawing material from a source external of the truck during loading thereof, said loading conduit being connected at one end tangentially into the top of said collector tank to effect centrifugal separation of said material drawn through said loading conduit from the entraining air for gravity feed thereof to said air lock means.

10. A self-loading and self-unloading truck for transporting bulk material, said truck comprising a plurality of bins supported on the truck, each said bin having a filler opening adjacent its top and a discharge opening at its bottom for gravity feed of the bulk material therefrom, conveyor means under said bins for carrying the material away from said bins, a blower, a substantially cylindrical housing disposed with its longitudinal axis substantially horizontal, air lock means in said housing including a paddle wheel extending axially through said housing and having a plurality of vanes projecting radially therefrom over substantially the entire width and length of said housing, means for rotating said paddle wheel, a hopper supported below the delivery end of said conveyor means, means for selectively connecting said hopper radially into said housing, conduit means directing the output of said blower axially through said housing between two adjacent said vanes for air-entrainment of material in said housing, a feed conduit connected to the opposite end of said housing from said conduit means to receive said air-entrained material for selectively conducting said material through said filler openings during loading and outside said truck during unloading, a collector tank, conduit means connecting the intake of said blower to said tank for reducing the pressure therein, means for conducting material from said tank radially into said housing during loading, and a loading conduit connected tangentially into said tank for drawing air-entrained material thereinto from a source external of said truck during loading.

11. In a self-unloading truck for transporting bulk material, the combination of at least one bin supported on said truck for receiving said material, a controllable gate in the bottom of said bin providing for gravity feed of the material therefrom, a hopper mounted on said truck spaced from said bin, conveyor means for carrying the material from said gate to said hopper, means for regulating the flow of material along said conveyor means, a blower mounted on said truck, an air lock for feeding material from said hopper including a closed substantially cylindrical housing having an opening extending longitudinally thereof and communicable radially thereof with said hopper, a paddle wheel rotatably mounted within said housing and extending the entire length thereof and having a plurality of vanes projecting radially to the inner surface of said housing, conduit means conducting the output of said blower into one end of said housing defining an inlet spaced radially from said longitudinal opening therein, the cross-section defined between any two adjacent said vanes being substantially equal to the cross-section of said inlet, means defining an outlet in the other end of said housing in longitudinal alignment with said inlet, and conduit means for connecting said outlet to a storage space external of said truck.

12. In a truck for transporting loose bulk material, the combination of at least one closed bin supported on said truck for receiving the material, an outlet in the bottom of said bin providing for gravity feed of material therefrom, a blower mounted on said truck, a collector tank mounted on said truck spaced from said bin and connected to the intake of said blower for maintaining a reduced pressure therein, a loading conduit connected at one end tangentially into said tank for effecting centrifugal separation from the entraining air of the material drawn into the other end of said loading conduit at a source external of said truck, air lock means in flow communication with said collector tank for receiving the separated material therefrom, said air lock means being connected to the output of said blower and effective to entrain material received from said tank in the air stream issuing from said blower, a loading conduit attached to said air lock means for receiving air-entrained material therefrom, a filling conduit connected to said loading conduit and opening into said bin, a gate valve controlling the access of said filling conduit to said bin, a vent duct opening at one end into said bin, and a vent gate controlling the opening of said vent duct to said bin, said gate valve and said vent duct being simultaneously openable to insure venting of said bin during loading.

13. In a self-loading truck for transporting bulk material the combination of a plurality of closed bins mounted on said truck for receiving the material, a filling conduit extending into said bins adjacent the top thereof, means for withdrawing the material from a source external of said truck and entraining it in a stream of air under pressure, means for conducting the air-entrained material to said filling conduit, and means for directing the material from said filling conduit into a selected said bin including gate valves in said conduit within each said bin, said valves including a plate mounted for sliding movement through a cross section of said filling conduit, each said plate being attached to the adjacent portion of said conduit which receives the material and having an aperture formed therethrough providing for normal passage of the material through said conduit, and means for selectively sliding said plates to closed positions for flexing the portion of said conduit receiving said material into a filling position wherein said plate aperture communicates with the interior of said bin and the remainder of said conduit is blocked by said plate.

14. In a self-loading truck for transporting bulk material the combination of a plurality of closed bins mounted on said truck for receiving the material, a filling conduit extending into said bins, means for withdrawing the material from a source external of said truck and entraining it in a stream of air under pressure, means for conducting the air-entrained material to said filling conduit, and means for directing the material from said filling conduit into a selected said bin including gate valves in said conduit within each said bin, said valves including a plate mounted for sliding movement through a cross section of said filling conduit, each said plate being attached to the adjacent portion of said conduit which receives the material and having an aperture formed therethrough providing for normal passage of the material through said conduit, means for selectively sliding said plates to closed positions for flexing the portion of said conduit receiving said material into a filling position wherein said plate aperture communicates with the interior of said bin and the remainder of said conduit is blocked by said plate, a vent duct opening into each of said bins providing for removal of the entraining air and dust from said bins arising during filling operations, and a filter attached to the end of said vent duct for collecting said dust and preventing its access to the surrounding atmosphere.

15. In a self-loading truck for transporting bulk material the combination of a plurality of closed bins mounted on said truck for receiving the material, a filling conduit extending into said bins, means for withdrawing the material from a source external of said truck and entraining it in a stream of air under pressure, means for conducting the air-entrained material to said filling conduit, means for directing the material from said filling conduit into a selected said bin including gate valves in said conduit within each said bin, said valves including a plate mounted for sliding movement through a cross section of said filling conduit, each said plate being attached to the adjacent portion of said conduit which receives the material and having an aperture formed therethrough providing for normal passage of the material through said conduit, means for selectively sliding said plates to closed positions for flexing the portion of said conduit receiving said material into a filling position wherein said plate aperture communicates with the interior of said bin and the remainder of said conduit is blocked by said plate, a vent duct extending into each of said bins and opening into the surrounding atmosphere, vent gates normally closing said openings and connected to said gate valve plates to provide for opening of the appropriate said vent duct upon closing of one of said gate valves, and control means for operating said gate valves and said vent gates from a single control position on said truck.

16. In a self-loading truck for transporting bulk material the combination of a plurality of closed bins mounted on said truck for receiving the material, a filling conduit extending into said bins adjacent the top thereof, means for withdrawing the material from a source external of said truck and entraining it in a stream of air under pressure, means for conducting the air-entrained material to said filling conduit, means for directing the material from said filling conduit into a selected said bin including gate valves in said conduit within each said bin, said valves including a plate mounted for sliding movement through a cross section of said filling conduit, each said plate being attached to the adjacent portion of said conduit which receives the material and having an aperture formed therethrough providing for normal passage of the material through said conduit, means for selectively sliding said plates to closed positions for flexing the portion of said conduit receiving said material into a filling position wherein said plate aperture communicates with the interior of said bin and the remainder of said conduit is blocked by said plate, a vent duct extending into each of said bins and opening into the surrounding atmosphere, vent gates normally closing the openings of said vent duct into said bins, and control means associated with said plate sliding means for selectively opening the vent gate associated with the adjacent said gate valve to provide for venting of the said bin being filled from said filling conduit, said control means including a central control station for operating all of said vent gates and gate valves.

17. The combination as set forth in claim 11 in which said means for regulating the flow of material along said conveyor means includes a control gate mounted transversely of said conveyor means and movable vertically with respect thereto for regulating the material-to-air ratio in said air lock means.

References Cited in the file of this patent

UNITED STATES PATENTS

| | | |
|---|---|---|
| 2,087,464 | Ayers | July 20, 1937 |
| 2,089,347 | Dondlinger | Aug. 10, 1937 |
| 2,116,603 | Holly | May 10, 1938 |
| 2,230,425 | Finnegan | Feb. 4, 1941 |
| 2,511,246 | Chamberlin | June 13, 1950 |
| 2,589,988 | Bruno | Mar. 18, 1952 |
| 2,681,748 | Weller | June 22, 1954 |

UNITED STATES PATENT OFFICE
CERTIFICATE OF CORRECTION

Patent No. 2,798,628   July 9, 1957

Chester Donald Fisher

It is hereby certified that error appears in the above numbered patent requiring correction and that the said Letters Patent should read as corrected below.

In the drawings, Sheets 1 to 6, inclusive, containing figures 1 to 18, inclusive, lower right-hand portion thereof, in each occurrence, name of inventor, for "CLARENCE D. FISHER", read -- CHESTER D. FISHER --.

Signed and sealed this 15th day of October 1957.

(SEAL)

Attest:
KARL H. AXLINE

Attesting Officer

ROBERT C. WATSON
Commissioner of Patents